United States Patent
Yamada (10) Patent No.: US 7,677,875 B2
(45) Date of Patent: Mar. 16, 2010

(54) INJECTION MOLDING MACHINE FOR CONTROLLING MEASUREMENT OF AN IN-LINE SCREW

(75) Inventor: Akio Yamada, Kakogawa (JP)

(73) Assignee: Toyo Machinery & Metal Co., Ltd., Akashi-shi (JP)

( * ) Notice: Subject to any disclaimer, the term of this patent is extended or adjusted under 35 U.S.C. 154(b) by 0 days.

(21) Appl. No.: 12/208,209

(22) Filed: Sep. 10, 2008

(65) Prior Publication Data
US 2009/0017152 A1    Jan. 15, 2009

Related U.S. Application Data

(62) Division of application No. 11/085,059, filed on Mar. 22, 2005.

(30) Foreign Application Priority Data

Dec. 20, 2004    (JP)    ............................. 2004-367896

(51) Int. Cl.
B29C 45/77    (2006.01)

(52) U.S. Cl. .................. 425/145; 264/40.5; 264/40.7
(58) Field of Classification Search ................ 264/40.5, 264/40.7; 425/145
See application file for complete search history.

(56) References Cited

U.S. PATENT DOCUMENTS

| 5,741,449 | A | * | 4/1998 | Yamamura et al. | .......... 425/143 |
| 5,906,777 | A | * | 5/1999 | Kamiguchi et al. | ......... 425/149 |
| 6,051,896 | A | * | 4/2000 | Shibuya et al. | ................. 425/3 |
| 2001/0026031 | A1 | | 10/2001 | Onishi | |

* cited by examiner

Primary Examiner—Tim Heitbrink
(74) Attorney, Agent, or Firm—Crowell & Moring LLP (57) ABSTRACT

A method for controlling measurement in a motor-driven in-line screw type injection molding machine using servo-motors as a measurement driving source and an injection driving source. Control is made so that all of a measured value of back pressure controlled by the measurement servo-motor, a measured value of an astern speed of a screw controlled by the injection servo-motor, and a measured rotational speed of the screw turn zero concurrently at timing when the screw reaches a measurement completion position. Thus, suck-back can be made dispensable.

1 Claim, 5 Drawing Sheets

FIG. 1

FIG. 5

INJECTION MOLDING MACHINE FOR CONTROLLING MEASUREMENT OF AN IN-LINE SCREW

FIELD OF THE INVENTION

The present invention relates to a technique for controlling measurement in a motor-driven in-line screw type injection molding machine using servo-motors as a measurement driving source and an injection driving source.

BACKGROUND ART

In a motor-driven in-line screw type injection molding machine in the background art, a measuring stroke is often controlled as follows. That is, a measurement servo-motor is controlled by rotational velocity feedback control so that the rotational velocity of a screw coincides with a set value, while an injection servo-motor is controlled by pressure feedback control so that the back pressure applied onto the screw (resistant pressure against astern movement of the screw) coincides with a set value. When such rotational velocity feedback control is performed on the measurement servo-motor while such pressure feedback control is performed on the injection servo-motor, the back pressure applied to the screw is improved to coincide with the set value. However, assume that setting is done to make the back pressure zero at the end of measurement. When control is performed in this setting to make the back pressure zero at the end of measurement, there must be a variation in the position where the screw stops its astern movement, due to the injection servo-motor subjected to the feedback control giving preference to pressure.

Therefore, the present inventor has proposed a measurement control method in Japanese Patent Application No. 2003-199230. In the measurement control method, measuring operation is carried out as follows. That is, speed feedback control is performed on an injection servo-motor so that the astern speed of a screw follows an astern speed setting pattern, while pressure feedback control is performed on a measurement servo-motor so that the back pressure applied to the screw follows a back pressure setting pattern (in other words, feedback control is performed to control the measuring rotational velocity to follow the back pressure setting pattern). Thus, the position where measurement is completed is made to coincide with a set position.

In the previously proposed measurement control method, feedback control is applied to a rotational velocity command to be supplied to the measurement motor so that the back pressure follows the back pressure setting pattern. Accordingly, in the beginning of measurement, shortage of raw resin leads to failure in expected increase of the back pressure. As a result, the measuring operation may be unstable. In addition, the measuring operation may be unstable in some operating condition of a raw resin supply system or in some dry condition of the resin. This is because the feed rate of the resin fed by the screw is not always increased in spite of increase in rotational velocity of the measurement motor, with the result that the back pressure does not increase to its expected value.

Therefore, the following configuration is also conceivable. That is, in a period between the start of a measuring stroke and the middle of the measuring stroke, driving of the measurement servo-motor is controlled by open control in which the set rotation number is constant, while driving of the injection servo-motor is controlled by back pressure feedback control in which the astern speed of the screw is controlled to make a measured back pressure value coincide with a set back pressure value. On and after the middle of the measuring stroke in which the astern speed of the screw is stabilized (that is, the back pressure is stabilized), the driving of the measurement servo-motor is controlled by back pressure feedback control in which the rotational velocity of the measurement servo-motor is controlled to follow a back pressure setting pattern. Thus, the back pressure can be controlled stably by the measurement servo-motor. On the other hand, the injection servo-motor is controlled by astern speed control in which the position where the screw stops its astern movement is made to coincide with the position where the measurement is completed. When control is performed thus, the position where the measurement is completed can be controlled to coincide with its set position by the injection servo-motor, while back pressure can be controlled stably by feedback control using the measurement motor on and after the middle of the measuring stroke.

When control is performed thus, the following problem remains in spite of various advantages. That is, setting is done so that the position where the astern speed is zero in a deceleration setting pattern for the injection servo-motor in the ending of the measuring stroke coincides with the predetermined position where the measuring stroke is completed. Further, the driving of the measurement servo-motor is controlled by back pressure feedback control following a back pressure decompression setting pattern calculated into a value proportional to the deceleration setting pattern. In spite of such control, there is a problem that it cannot be guaranteed that all of a measured value of the astern speed of the screw controlled by the injection servo-motor, a measured value of the back pressure controlled by the measurement servo-motor and a measured rotational velocity of the screw turn zero concurrently at timing when the screw reaches a position where measurement is completed. The background art has showed no consideration for the control to make all of the measured value of the astern speed of the screw, the measured value of the back pressure and the measured rotational velocity of the screw zero concurrently. That is, in the background art, the deceleration setting pattern for the astern speed of the screw is not proper but is apt to be set to be steep. Accordingly, the deceleration in the rotational velocity control upon the measurement servo-motor controlling the back pressure cannot follow the control in which the astern speed of the screw approaches zero rapidly. Even when the astern speed of the screw is close to zero, the measurement servo-motor has a certain degree of rotational velocity (resin is fed at a certain rate). Thus, the back pressure is adversely increased near the zero point of the astern speed of the screw. As a result, a known suck-back operation has to be carried out after the completion of the measuring operation.

SUMMARY OF THE INVENTION

The present invention was developed in consideration of the foregoing problem. It is an object of the present invention to make all of a measured value of the astern speed of a screw, a measured value of the back pressure and a measured rotational velocity of the screw (measurement servo-motor) zero concurrently at timing when the screw reaches a position where measurement is completed, so that suck-back can be made dispensable.

In order to attain the foregoing object, according to one aspect of the invention, in a method for controlling measurement in an in-line screw type injection molding machine using servo-motors as a measurement driving source and an injection driving source:

in a period between a measurement start position and a measurement control changeover position on a measuring stroke, driving of the measurement servo-motor is controlled by open control with a constant set rotational velocity of a screw, while driving of the injection servo-motor is controlled by back pressure feedback control in which an astern speed of the screw is controlled to follow a set value of back pressure set in advance;

in the period between the measurement control changeover position and the measurement completion position, driving of the injection servo-motor is controlled by open control following an astern speed setting pattern having a region of a constant astern speed calculated from a measured astern speed in a position short of the measurement control changeover position, while driving of the measurement servo-motor is controlled initially by back pressure feedback control in which the rotational velocity of the screw is controlled to follow the set back pressure value set in advance, and next controlled by back pressure feedback control in which the rotational velocity of the screw is controlled to follow a back pressure decompression setting pattern calculated into a value proportional to a deceleration pattern in the astern speed setting pattern for the open control;

the deceleration pattern between a position where the astern speed is constant and a position where the astern speed is zero in the astern speed setting pattern between the measurement control changeover position and the measurement completion position is set so that the position where the astern speed is zero coincides with only the measurement completion position, and a position where a rotation number is zero in a deceleration pattern of a measured rotational speed of the screw with respect to a time axis coincides with only timing when the screw reaches the measurement completion position; and control is made so that all of a measured value of the back pressure controlled by the measurement servo-motor, a measured value of the astern speed of the screw controlled by the injection servo-motor, and a measured rotational speed of the screw turn zero concurrently at timing when the screw reaches the measurement completion position.

According to the invention, control is made so that all the measured value of the astern speed of the screw, the measured value of the back pressure, and the measured rotational speed of the screw (measurement servo-motor) turn zero concurrently at timing when the screw reaches the measurement completion position. Accordingly, the residual pressure of molten resin staying in a heating cylinder till the next injection becomes zero. Thus, there is no fear that drooling or cobwebbing occurs when a mold is opened and a molded item is released from the mold. It is therefore unnecessary to perform suck-back after measurement is completed. In addition, since it is unnecessary to perform suck-back and any injection operation can be always started in a constant measurement completion position, the injection rate is stabilized, and the cushion thickness is also stabilized. Furthermore, the back pressure and the screw (measurement servo-motor) rotation turn zero as soon as the screw stops its astern movement. Thus, the variation in weight among molded items can be made as low as possible in cooperation with the stabilized density of the measured molten resin, the stabilized injection rate and the stabilized cushion thickness.

DESCRIPTION OF THE PREFERRED EMBODIMENT

Figure 1:
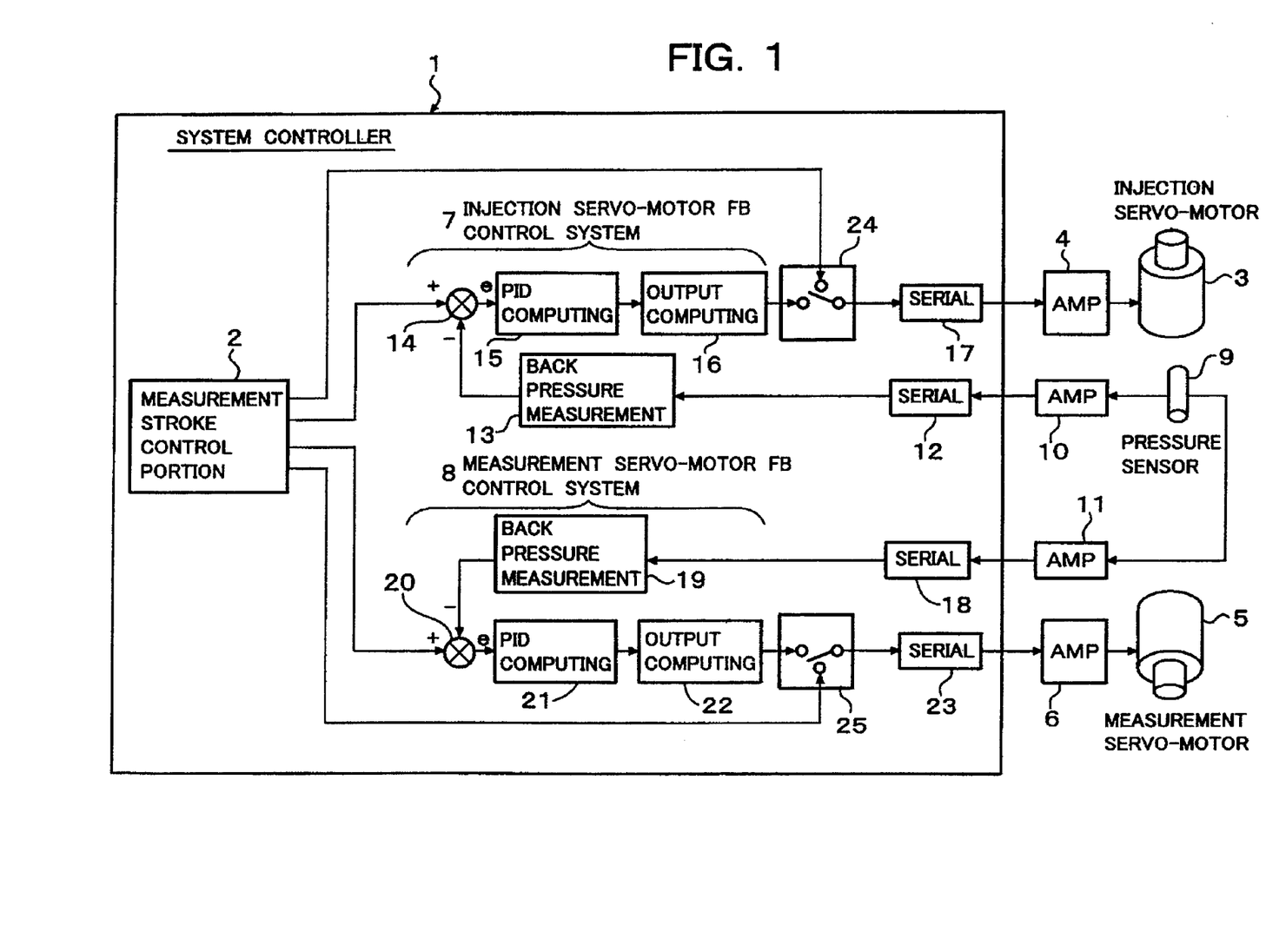
FIG. 1 is a block diagram showing the configuration of a measurement control system in a motor-driven in-line screw type injection molding machine according to an embodiment of the present invention.

An embodiment of the present invention will be described below with reference to the drawings. FIG. 1 is a block diagram showing the configuration of a measurement control system in a motor-driven in-line screw type injection molding machine according to an embodiment of the present invention (hereinafter referred to as "this embodiment").

In FIG. 1, the reference numeral 1 represents a system controller for administering control all over the injection molding machine. Here, only the configuration of a measurement control system is depicted in the system controller 1 in order to simplify the illustration.

In FIG. 1, the reference numeral 2 represents a measuring stroke control portion for administering host control of measurement operation. The measuring stroke control portion 2 supplies a command output directly to an amplifier 4 through a control changeover switch 24 and a serial port 17 so as to perform open control to control the driving of an injection servo-motor 3 serving as a driving source for driving a screw forward/backward. Alternatively, the measuring stroke control portion 2 performs feedback control upon the injection servo-motor 3 through an injection servo-motor feedback control system 7, the control changeover switch 24, the serial port 17 and the amplifier 4 so as to control the driving of the injection servo-motor 3. In addition, the measuring stroke control portion 2 supplies a command output directly to an amplifier 6 through a control changeover switch 25 and a serial port 23 so as to perform open control to control the driving of a measurement servo-motor 5 serving as a driving source for rotating the screw. Alternatively, the measuring stroke control portion 2 performs feedback control upon the measurement servo-motor 5 through a measurement servo-motor feedback control system 8, the control changeover switch 25, the serial port 23 and the amplifier 6 so as to control the driving of the measurement servo-motor 5. Incidentally, the measuring stroke control portion 2 has a function of recognizing the position or the astern speed of the screw based on an output of a not-shown encoder provided additionally to the injection servo-motor 3 or recognizing the rotational velocity of the screw based on an output of a not-shown encoder provided additionally to the measurement servo-motor 5, a function of storing various set values or calculating and setting the set values based on computing results, and so on. In addition, the measuring stroke control portion 2 also has a function of changing over the control changeover switches 24 and 25 synchronously. In the control changeover switch 24, the output of the feedback control system is selected till a measurement control changeover position S3 which will be described later, while the output of the open control system is selected on and after the measurement control changeover position S3. In the control changeover switch 25, the output of the open control system is selected till the measurement control changeover position S3 which will be described later, while the output of the feedback control system is selected on and after the measurement control changeover position S3.

A set back pressure value (back pressure command value following a predetermined back pressure setting pattern) from the measuring stroke control portion 2 and a measured back pressure value from a back pressure measuring portion 13 are supplied to a deviation detection portion 14 of the injection servo-motor feedback control system 7. The back pressure measuring portion 13 measures the measured back pressure value on the basis of an output of a pressure sensor 9 received through an amplifier 10 and a serial port 12. The pressure sensor 9 measures pressure applied to the screw. A deviation $\underline{e}$ obtained in the deviation detection portion 14 is output to a PID computing portion 15. The PID computing portion 15 performs a computing process for performing a feedback process based on PID (Proportional-Integral-Differential) operation using the input deviation $\underline{e}$ so as to calculate a manipulated variable for making the measured back pressure value coincide with the set back pressure value. The calculated manipulated variable is output to an output computing portion 16. In the output computing portion 16, a control output value is calculated using the input manipulated variable. The calculated control output value is supplied to the injection servo-motor 3 through the control changeover switch 24, the serial port 17 and the amplifier 4. Based on the control output, back pressure feedback control is performed as follows. That is, the astern speed of the screw is controlled by the injection servo-motor 3 so that the measured back pressure value coincides with the back pressure setting pattern in a region of the measuring stroke as will be described later.

A set back pressure value (back pressure command value following a predetermined back pressure setting pattern or a set back pressure value based on a back pressure setting pattern obtained by calculation in the measuring stroke control portion 2 as will be described later) from the measuring stroke control portion 2 and a measured back pressure value from a back pressure measuring portion 19 are supplied to a deviation detection portion 20 of the measurement servo-motor feedback control system 8. The back pressure measuring portion 19 measures the measured back pressure value on the basis of an output of a pressure sensor 10 received through an amplifier 11 and a serial port 18. The pressure sensor 10 measures pressure applied to the screw. A deviation $\underline{e}$ obtained in the deviation detection portion 20 is output to a PID computing portion 21. The PID computing portion 21 performs a computing process for performing a feedback process based on PID operation using the input deviation $\underline{e}$ so as to calculate a manipulated variable for making the measured back pressure value coincide with the set back pressure value. The calculated manipulated variable is output to an output computing portion 22. In the output computing portion 22, a control output value is calculated using the input manipulated variable. The calculated control output value is supplied to the measurement servo-motor 5 through the control changeover switch 25, the serial port 23 and the amplifier 6. Based on the control output, back pressure feedback control is performed as follows. That is, the rotational velocity of the screw is controlled by the measurement servo-motor 5 so that the measured back pressure value coincides with the back pressure setting pattern in a region of the measuring stroke as will be described later.

Figure 2:
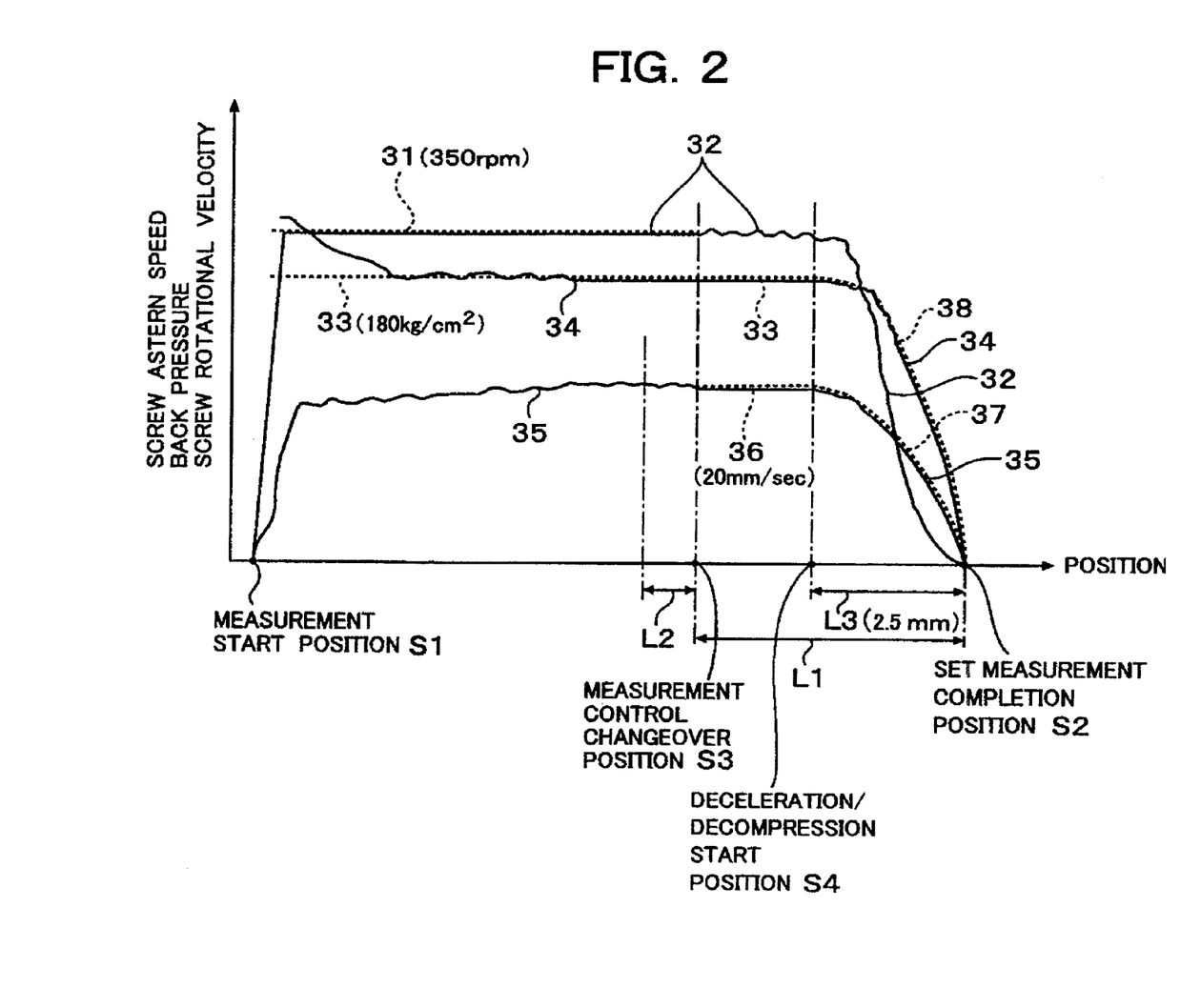
FIG. 2 is an explanatory diagram showing the transition in relationship among the rotational velocity of a screw, the back pressure and the astern speed of the screw along a position axis in a measurement control method according to the present invention.
Figure 3:
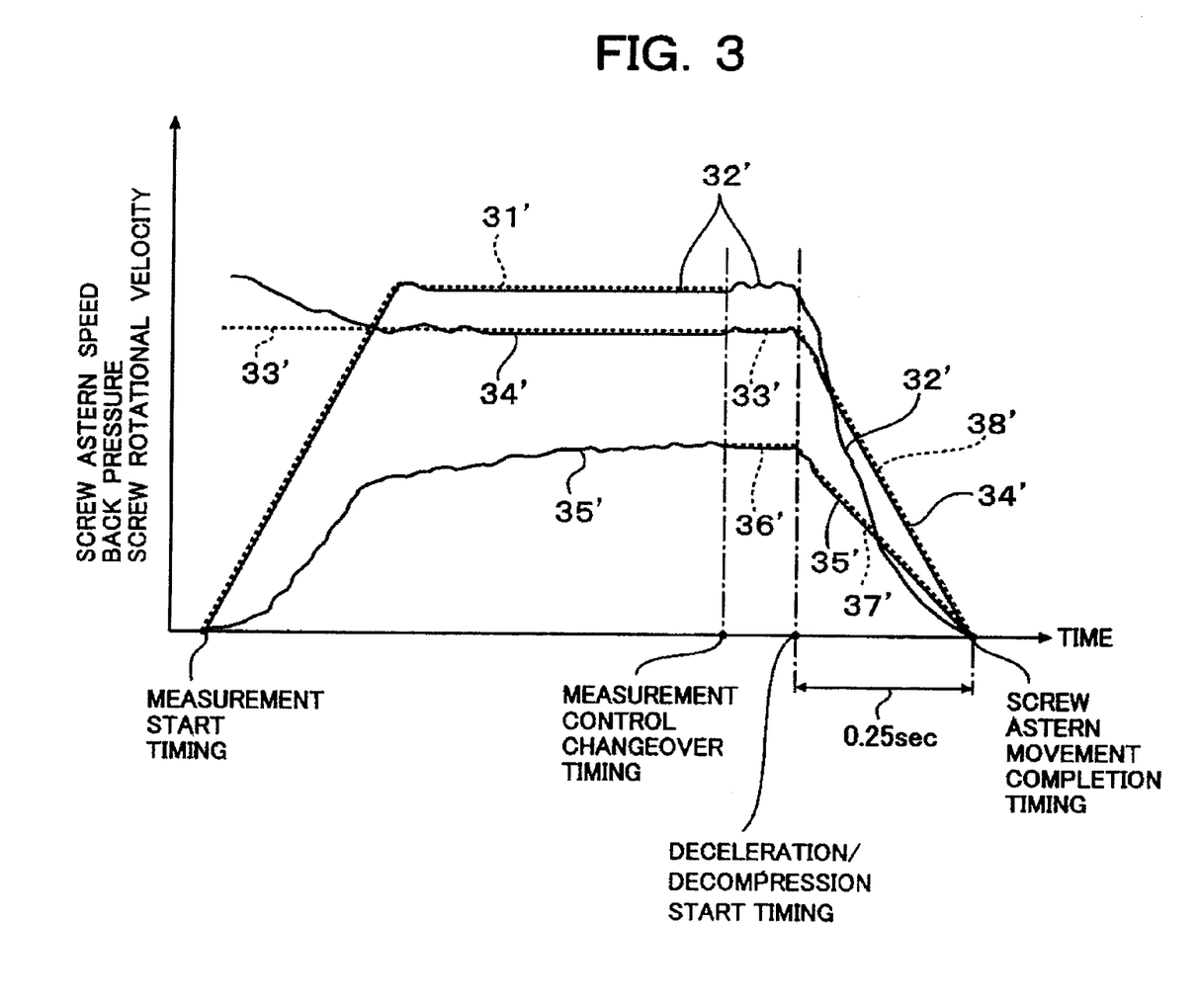
FIG. 3 is an explanatory diagram showing the transition in relationship among the rotational velocity of the screw, the back pressure and the astern speed of the screw along a time axis in the measurement control method according to the present invention.

Next, the measuring operation in this embodiment will be described with reference to FIGS. 2 and 3 showing the condition of the measuring stroke in this embodiment. FIG. 2 shows the transition in relationship among the screw rotational velocity, the back pressure and the screw astern speed along a position axis. FIG. 3 shows the transition in relationship among the screw rotational velocity, the back pressure and the screw astern speed along a time axis. Incidentally, here, a molded item (product) weighing 3.5 g is molded by way of example.

A set measurement completion position S2 is defined by a predetermined distance from a measurement start position S1 (or defined by an absolute value). A measurement control changeover position S3 is defined by a predetermined distance L1 from the set measurement completion position S2. The measuring stroke control portion 2 changes over its control in the measurement control changeover position S3 as a boundary. First, between the measurement start position S1 and the measurement control changeover position S3, the measuring stroke control portion 2 controls the driving of the measurement servo-motor 5 by open control using a predetermined set screw rotational velocity 31 (here, for example, 350 rpm). Thus, the measurement servo-motor 5 is controlled so that a measured screw rotational velocity 32 substantially coincides with the set screw rotational velocity 31. In addition, between the measurement start position S1 and the measurement control changeover position S3, the measuring stroke control portion 2 controls the driving of the injection servo-motor 3 by back pressure feedback control using a predetermined set back pressure value 32 (here, for example, 180 kg/cm$^2$). Thus, the screw astern speed of the injection servo-motor 3 is controlled so that a measured back pressure value 34 detected from the output of the pressure sensor 9 coincides with the set back pressure value 33. As a result, the measured screw astern speed 35 is stabilized gradually while increasing. The measured screw astern speed 35 has been stabilized in a predetermined region before the set measurement completion position S2.

Before the screw reaches the measurement control changeover position S3, between a position short of the measurement control changeover position S3 by a predetermined distance L2 and the measurement control changeover position S3, the measuring stroke control portion 2 calculates and sets screw astern speed setting patterns 36 and 37 on and after the measurement control changeover position based on an average value of measured screw astern speeds 35 sampled a plurality of times. The screw astern speed setting patterns 36 and 37 serve as set values for performing open control upon the injection servo-motor 3 on and after the measurement control changeover position S3. The initial setting pattern 36 set from the measurement control changeover position S3 serves to generate a region where the astern speed is constant and equal to the average value of the measured screw astern speeds 35 in the aforementioned stable region. Here, for example, the initial setting pattern 36 is set to be 20 mm/sec. The screw astern speed setting pattern 37 set in succession to the setting pattern 36 and until the set measurement completion position S2 is determined in accordance with a deceleration/decompression start position S4 set by an operator. This is an optimum deceleration pattern of the screw astern speed depending on a distance L3 (here, for example, 2.5 mm) optimized based on the set measurement completion position S2. This screw astern speed setting pattern (set deceleration pattern) 37 is calculated as setting pattern (set deceleration pattern) 37 along the position axis, based on a setting pattern (set deceleration pattern) 37' along the time axis. The setting pattern (set deceleration pattern) 37' is obtained by linearly connecting the value of the screw astern speed at the deceleration/decompression start timing shown on the time axis in FIG. 3, and the zero value at the timing when the astern movement of the screw is completed. The setting pattern (set deceleration pattern) 37' can be obtained from the value of the astern speed in the setting pattern 36 and the time (here, for example, 0.25 sec) defined by the aforementioned distance L3. Before the screw reaches the measurement control changeover position S3, the measuring stroke control portion 2 has set a back pressure deceleration setting pattern 38 based on the screw astern speed setting pattern (set deceleration pattern) 37' so that the back pressure deceleration setting pattern 38 has a value calculated in proportion to the screw astern speed setting pattern (set deceleration pattern) 37'. This back pressure deceleration setting pattern 38 is calculated as a back pressure deceleration setting pattern 38 along the position axis, based on a back pressure deceleration setting pattern 38' obtained by proportional operation from the screw astern speed setting pattern (set deceleration pattern) 37' shown along the time axis in FIG. 3.

Next, description will be made about the operation on and after the measurement control changeover position S3. Between the measurement control changeover position S3 and the position where the measurement is completed, the measuring stroke control portion 2 controls the driving of the injection servo-motor 3 by open control following the setting pattern 36 and the setting pattern (set deceleration pattern) 37 of the screw astern speed. Thus, the measured screw astern speed 35 follows the setting patterns 36 and 37 so that the screw stops its astern movement in a position corresponding to the set measurement completion position S2. Between the measurement control changeover position S3 and the position where the measurement is completed, the measuring stroke control portion 2 controls the driving of the measurement servo-motor 5 initially by back pressure feedback control in which the screw rotational velocity is controlled to follow the predetermined set back pressure value 33. On and after the deceleration/decompression start position S4, the measuring stroke control portion 2 controls the driving of the measurement servo-motor 5 by back pressure feedback control in which the screw rotational velocity is controlled to follow the back pressure deceleration setting pattern 38. Thus, the measured back pressure value 34 is controlled to follow the set back pressure value 33 and the back pressure deceleration setting pattern 38. Further, the measured screw rotational velocity 32 based on the control of the measurement servo-motor 5 subjected to the back pressure feedback control decreases due to the decompression of the back pressure and reaches zero in the set measurement completion position S2.

In FIG. 3, dashes are put on those corresponding to the reference numerals 31-38 in FIG. 2. In the example shown in FIGS. 2 and 3, the aforementioned distance L3 is optimized so that all of a measured screw astern speed 35', a measured screw rotational velocity 32' and a measured back pressure value 34' turn zero concurrently at the timing when the astern movement of the screw is completed (the timing when the screw stops its astern movement).

In order to make all the measured screw astern speed 35', the measured screw rotational velocity 32' and the measured back pressure value 34' zero concurrently on the time axis, it is essential to confirm that the zero position of the rotation number in the deceleration pattern of the measured screw rotational velocity 32' in view of the time axis coincides with only the timing when the astern movement of the screw is completed. The present inventor has discovered that it can be guaranteed in such a manner that the measured back pressure value 34' turns zero at the time when the astern movement of the screw is completed. The aforementioned distance L3 is optimized by trial shots with the distance L3 being changed appropriately till it is confirmed that the zero position of the rotation number in the deceleration pattern of the measured screw rotational velocity 32' in view of the time axis coincides with only the timing when the astern movement of the screw is completed.

Figure 4:
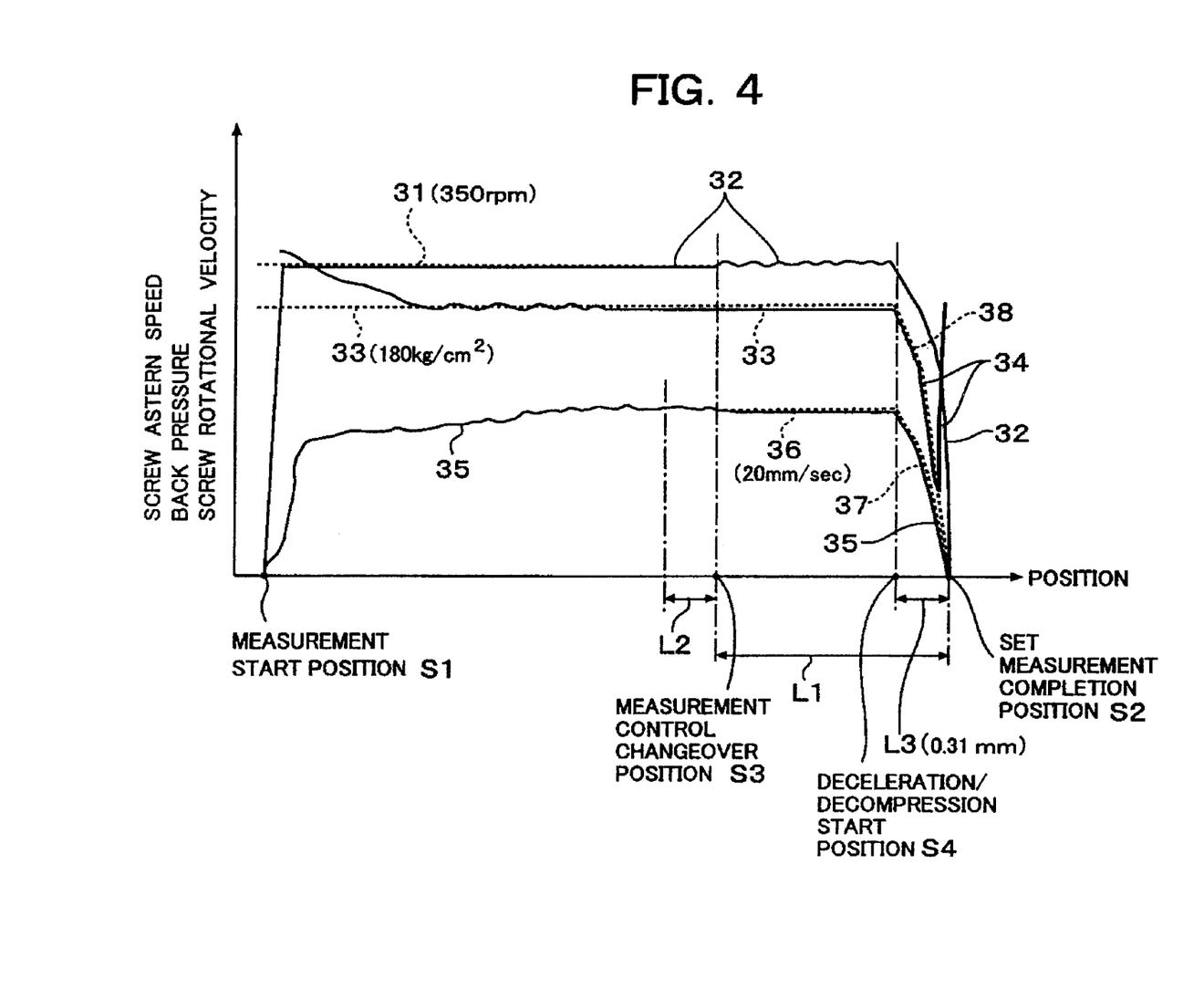
FIG. 4 is an explanatory diagram showing the transition in relationship among the rotational velocity of the screw, the back pressure and the astern speed of the screw along the position axis when a distance L3 is not set to be optimal in FIG. 2.
Figure 5:
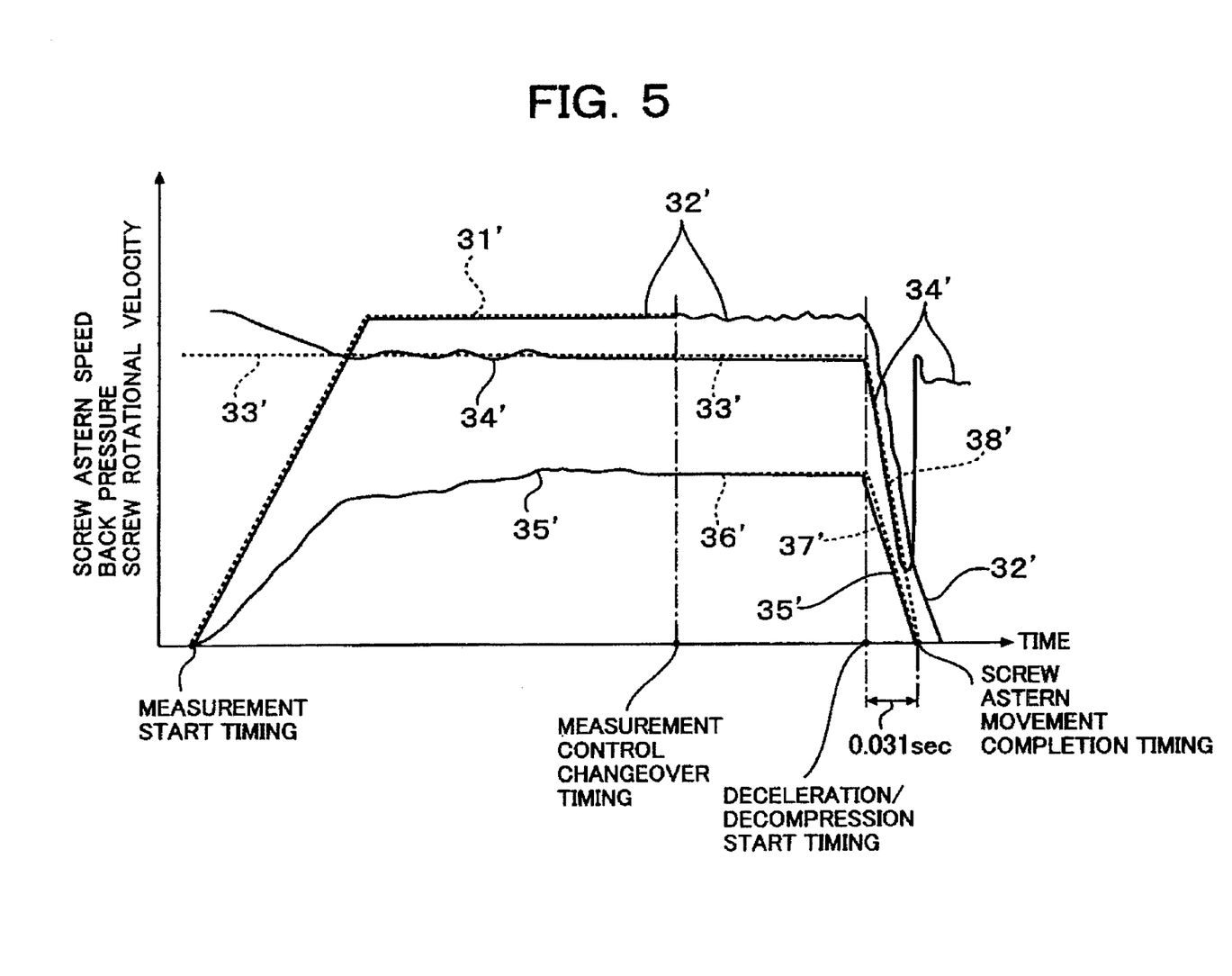
FIG. 5 is an explanatory diagram showing the transition in relationship among the rotational velocity of the screw, the back pressure and the astern speed of the screw along the time axis when the distance L3 is not set to be optimal in FIG. 3.

Next, description will be described about a problem when the aforementioned distance L3 has not been optimized, with reference to FIGS. 4 and 5. FIG. 4 shows the transition in relationship among the screw rotational velocity, the back pressure and the screw astern speed along the position axis. FIG. 5 shows the transition in relationship among the screw rotational velocity, the back pressure and the screw astern speed along the time axis. Incidentally, also here, a molded item (product) weighing 3.5 g is molded by way of example. FIG. 4 corresponds to FIG. 2, and FIG. 5 corresponds to FIG. 3.

In the example shown in FIG. 4, the deceleration/decompression start position S4 to be set short of the set measurement completion position S2 by the distance L3 is set closer to the set measurement completion position S2 than in FIG. 2. Here, the distance L3 is set to be about 0.31 mm. In accordance with this distance L3, the screw astern speed setting pattern (set deceleration pattern) 37 and the back pressure deceleration setting pattern 38 are obtained by calculation in the same manner as in the previous example. Thus, the obtained setting patterns 37 and 38 are set automatically. The driving of the injection servo-motor 3 is controlled by open control following the screw astern speed setting pattern (set deceleration pattern) 37. As a result, the measured screw astern speed 35 is decelerated suddenly following the setting pattern 37 so that the screw stops its astern movement in a position corresponding to the set measurement completion position S2. On the other hand, the driving of the measurement servo-motor 5 is controlled by back pressure feedback control in which the screw rotational velocity is controlled following the back pressure deceleration setting pattern 38. The measured back pressure value 34 rises slightly short of the set measurement completion position S2. Thus, the measured back pressure value 34 has a positive value in the set measurement completion position S2 even when the measured screw rotational velocity 32 turns zero in the set measurement completion position S2.

This will be described with reference to the transition on the time axis in FIG. 5. The measured screw astern speed 35' is decelerated suddenly at the start timing of deceleration/decompression. Even when the measured screw astern speed 35' approaches zero, the measured screw rotational speed 32' still has a certain value such that the measured back pressure value 34' rises slightly before the timing when the astern movement of the screw is completed. This is because resin is fed due to the rotation of the screw when the screw is stopping its astern movement. That is, the deceleration of the measured screw rotational velocity 32' resulting from the back pressure feedback control in which the screw rotational velocity is controlled with respect to the measured screw astern speed 35' cannot follow the deceleration of the measured screw astern velocity 35'. Thus, the measured screw rotational velocity 32' turns zero after the timing when the astern movement of the screw is completed. As a result, the back pressure is applied even when the screw stops rotating. It is therefore necessary to perform suck-back after the measurement is completed.

In contrast, in this embodiment, as described previously, control is made so that all the measured value of the screw astern speed, the measure value of the back pressure and the measured rotational velocity of the screw (measurement servo-motor) turn zero concurrently at the timing when the screw reaches the measurement completion position. Accordingly, the residual pressure of molten resin staying in the heating cylinder till the next injection becomes zero. Thus, there is no fear that drooling or cobwebbing occurs when a mold is opened and a molded item is released from the mold. It is therefore unnecessary to perform suck-back after measurement is completed. In addition, since it is unnecessary to perform suck-back and any injection operation can be always started in a constant measurement completion position, the injection rate is stabilized, and the cushion thickness is also stabilized. Furthermore, the back pressure and the screw (measurement servo-motor) rotation turn zero as soon as the screw stops its astern movement. Thus, the variation in weight among molded items can be made as low as possible in cooperation with the stabilized density of the measured molten resin, the stabilized injection rate and the stabilized cushion thickness (the variation range R of measured weight values was 0.07 g with respect to a molded item (product) weighing 3.5 g in the conditions of FIG. 5 while the variation R was reduced to 0.03 g with respect to a molded item (product) weighing 3.5 g in the conditions of FIGS. 2 and 3).

What is claimed is:

1. An in-line screw injection molding machine using servo-motors as a measurement driving source and an injection driving source, comprising:

means for controlling driving of said measurement servo-motor by open control with a constant set rotational velocity of a screw and controlling driving of said injection servo-motor by back pressure feedback control in which an astern speed of said screw is controlled to follow a set value of back pressure set in advance, in a period between a measurement start position and a measurement control changeover position on a measuring stroke;

means for controlling driving of said injection servo-motor by open control following an astern speed setting pattern and controlling driving of said measurement servo-motor by back pressure feedback control in which said rotational velocity of said screw is controlled, in a period between said measurement control changeover position and a measurement completion position;

wherein control is made so that all of a measured value of said back pressure controlled by said measurement servo-motor, a measured value of said astern speed of said screw controlled by said injection servo-motor, and a measured rotational speed of said screw turn zero concurrently at timing when said screw reaches said measurement completion position.

* * * * *